Aug. 21, 1962     H. B. BARRETT     3,049,953

LATHES AND METHOD OF MAKING SAME

Filed March 20, 1958     6 Sheets—Sheet 1

INVENTOR
HARRY B. BARRETT

BY *Alfred W. Petchaft*

ATTORNEY

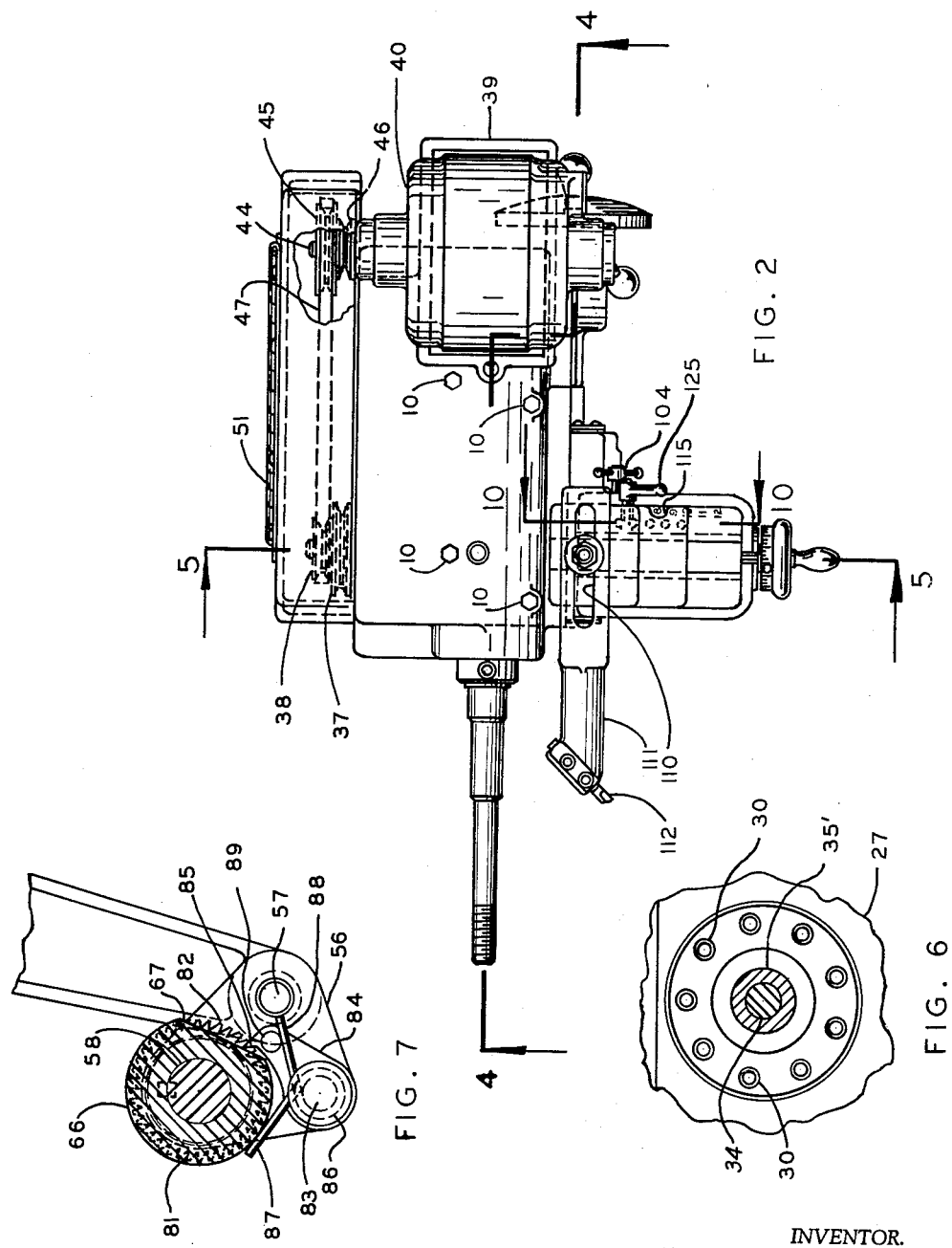

Aug. 21, 1962

H. B. BARRETT 3,049,953

LATHES AND METHOD OF MAKING SAME

Filed March 20, 1958

*INVENTOR*
HARRY B. BARRETT

BY Alfred W. Petchaft

ATTORNEY

INVENTOR.
HARRY B. BARRETT
BY
ATTORNEY

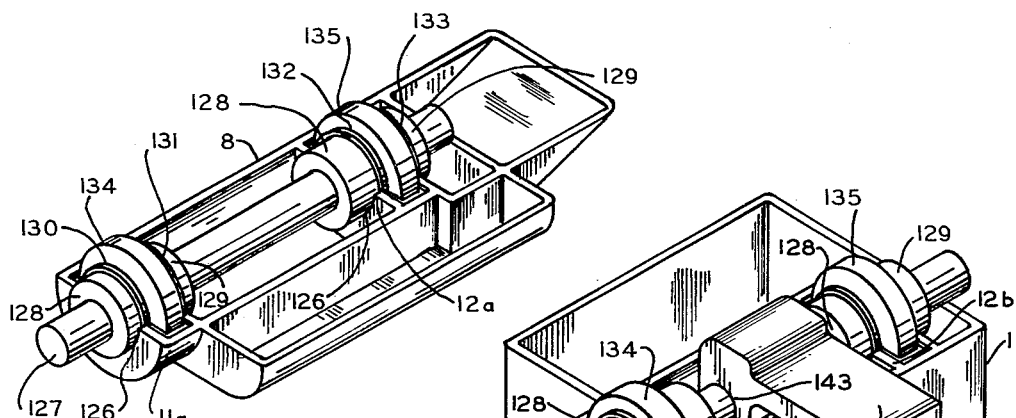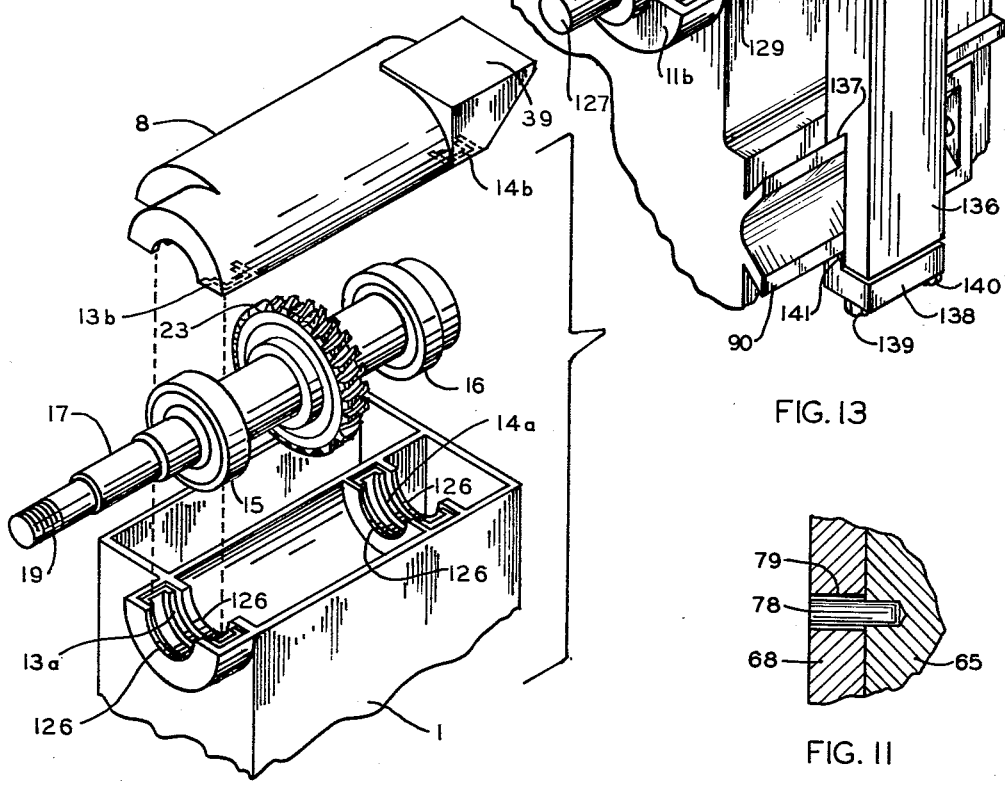

Aug. 21, 1962 H. B. BARRETT 3,049,953
LATHES AND METHOD OF MAKING SAME
Filed March 20, 1958 6 Sheets-Sheet 6

*INVENTOR.*
HARRY B. BARRETT
BY
Alfred W. Petchaft
ATTORNEY

United States Patent Office

3,049,953
Patented Aug. 21, 1962

3,049,953
LATHES AND METHOD OF MAKING SAME
Harry B. Barrett, Clayton, Mo.
(2101 Cass Ave., St. Louis 6, Mo.)
Filed Mar. 20, 1958, Ser. No. 722,795
7 Claims. (Cl. 82—24)

This invention relates in general to lathes and novel methods for manufacturing same.

It is a primary object of the present invention to provide a brake drum lathe which is relatively simple in construction but is, nevertheless, capable of turning and finishing a wide variety of brake drum sizes.

It is also an object of the present invention to provide a lathe wherein the cutting tool is progressively advanced and fed into the work after each revolution thereof and wherein the amount of advance of the tool may be quickly and easily adjusted.

It is a further object of the present invention to provide a lathe of the type stated wherein the cutting tool is readily indexed for various drum sizes and, therefore, reduces the amount of set-up time for the brake drum finishing operation.

It is an additional object of the present invention to provide a novel method of manufacturing and assembling lathes, as well as other types of machinery, in which the number of machining operations is reduced while at the same time maintaining accurate tolerances between the components.

It is another object of the present invention to provide a novel method of the type stated which permits accurate positioning of shaft bearings while eliminating the necessity of machining the bearing retainers.

With the above and other objects in view, my invention resides in the novel features of form, construction, arrangement, and combination of parts presently described and pointed out in the claims.

In the accompanying drawings—

FIG. 2 is a top plan view thereof;

Figure 1:
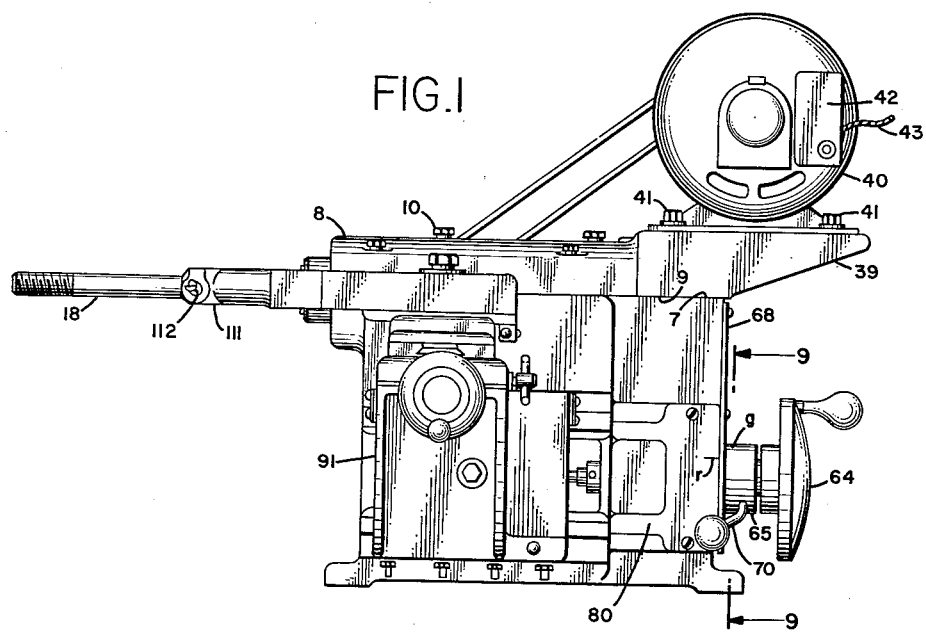
FIG. 1 is a front elevational view of a brake drum lathe constructed in accordance with and embodying the present invention.
Figure 4:
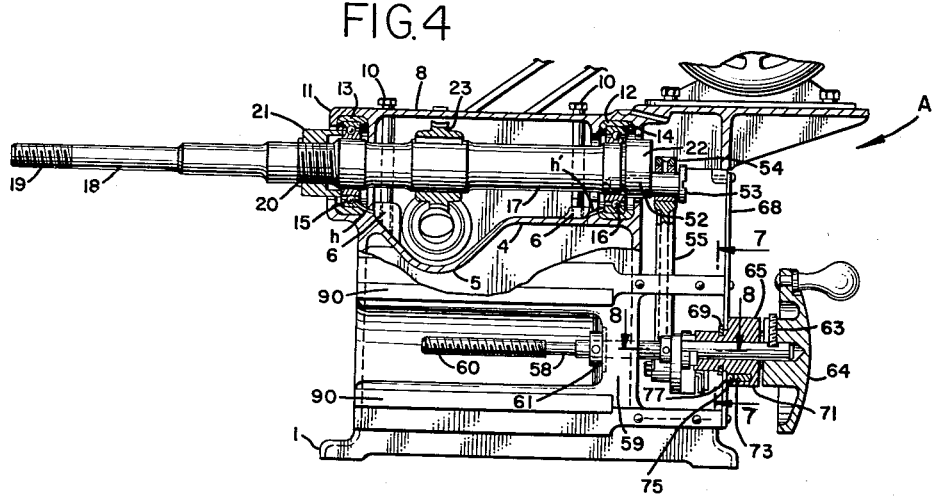
Figure 9:
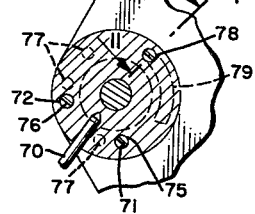
Figure 5:
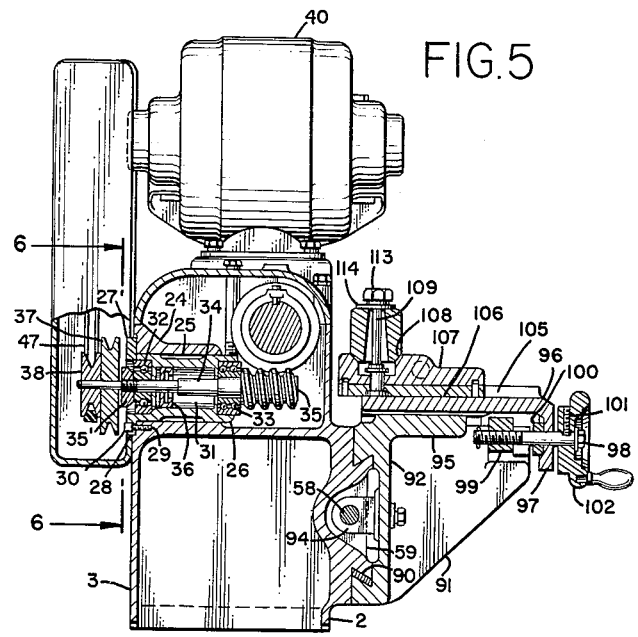
Figure 10:
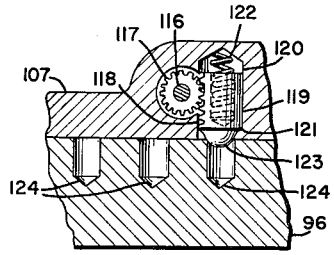
Figure 3:
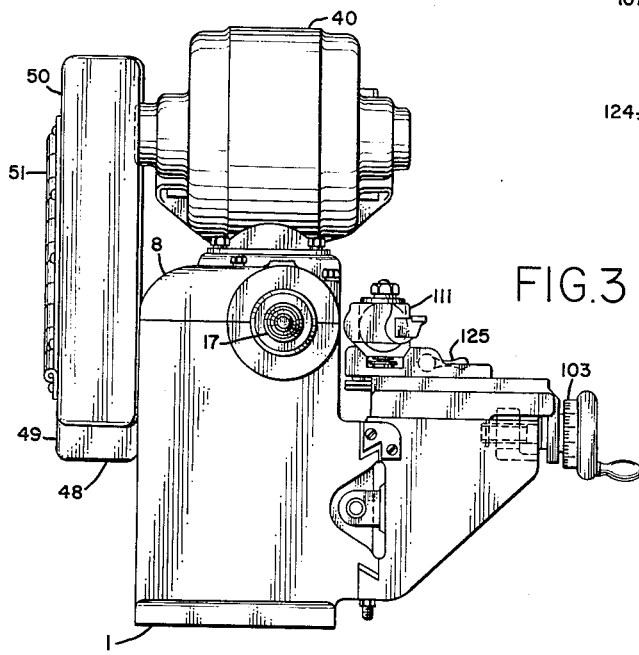
FIG. 3 is an end elevational view thereof.
Figure 8:
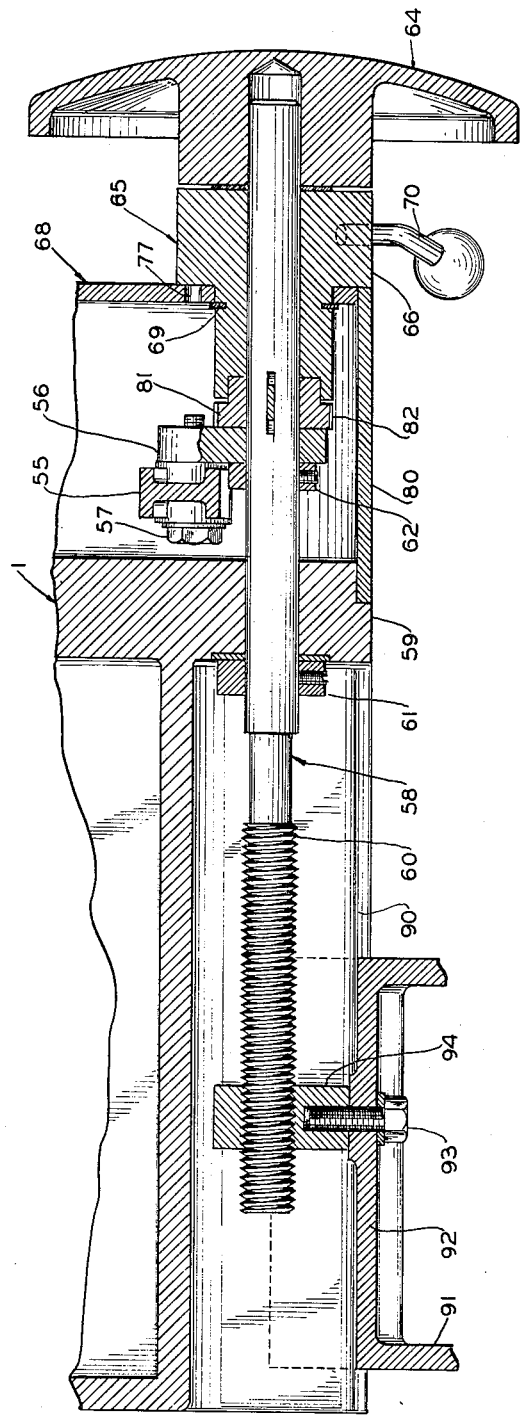
Figure 15:
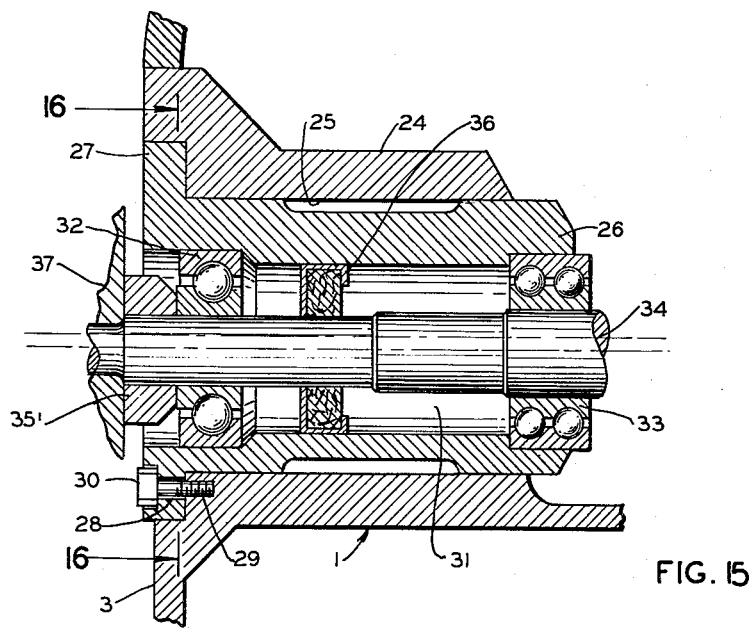
Figure 16:
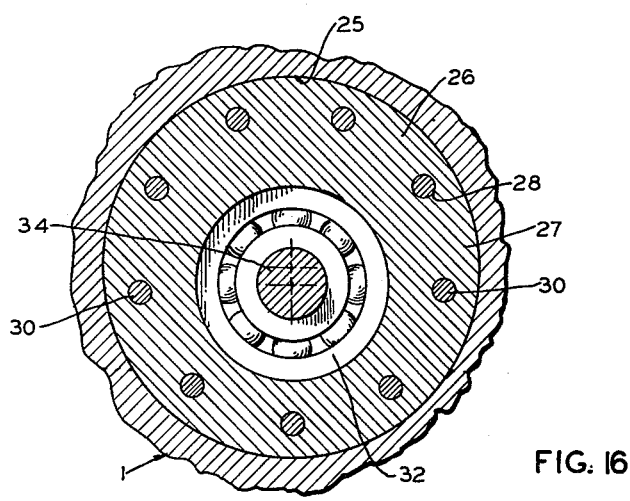

FIGS. 4 and 5 are fragmentary sectional views taken along lines 4—4 and 5—5, respectively, of FIG. 2;

FIG. 6 is a fragmentary sectional view taken along line 6—6 of FIG. 5;

FIGS. 7 and 8 are fragmentary sectional views taken along lines 7—7 and 8—8, respectively, of FIG. 4;

FIG. 9 is a fragmentary sectional view taken along line 9—9 of FIG. 1;

FIG. 10 is a fragmentary sectional view taken along line 10—10 of FIG. 2;

FIG. 11 is a fragmentary sectional view taken along line 11—11 of FIG. 9;

FIGS. 12, 13, and 14 are fragmentary perspective views showing the method of assembling the lathe housing and lathe spindle assembly, which method forms part of the present invention;

FIG. 15 is an enlarged sectional view showing the eccentric bearing mount for the worm shaft; and FIG. 16 is a transverse sectional view taken along line 16—16 of FIG. 15.

Referring now in more detail and by reference characters to the drawings which illustrate a practical embodiment of the present invention, A designates a brake drum lathe comprising a housing 1 having a front wall 2, a back wall 3, and a longitudinal partitioning wall 4, which includes an arcuate portion 5. Integrally formed on and extending upwardly from the wall 4 is a plurality of tapped bosses 6, the upper ends of which terminate in downwardly spaced relation from the upper edge 7 of the housing 1, and provided for cooperation with the housing 1 is a shell-like housing cover 8 having a lower edge 9 which fits in edgewise abutting relationship to the upper edge 7. Projecting through the cover 8 and threaded into the tapped bosses 6 is a plurality of bolts 10 which secure the cover 8 and housing 1 in rigid assembled relationship. Integrally formed on the housing 1 and cover 8 are axially aligned bearing retainers 11, 12, provided with babbitt linings 13, 14, and mounted within the babbitt linings 13, 14 are spaced aligned ball bearings 15, 16. Journaled in and extending horizontally through the bearings 15, 16, is a longitudinal spindle or shaft 17, this shaft 17 extending axially outwardly and beyond the bearing 15 and externally of the housing 1. Along such external end, the spindle or shaft 17 is turned down in the formation of a diametrically reduced portion 18 for supporting the work, such as an automotive brake drum. Drilled through the bearing retainers 11, 12 and babbitt linings 13, 14 at the lower ends thereof are oil return holes h, h'. The diametrically reduced portion 18 is provided with threads 19 at its outer end for receiving a work retaining collar (not shown). Intermediate its ends the spindle 17 is provided with a threaded portion 20 for receiving a retaining nut 21 which fits against the ball bearing 13, and at its other end the spindle 17 is provided with a diametrally enlarged portion 22 which bears thrustwise against the ball bearing 16. Keyed or otherwise rigidly secured upon the spindle 17 intermediate the bearings 15, 16 is a worm gear 23.

Integrally cast with the housing 1 and extending inwardly from the back wall 3 is an enlarged boss 24 having a central bore 25 for receiving a bearing retainer sleeve 26 provided at its outer end with an annular flange 27 which is disposed against the boss 24 as seen in FIG. 5. Formed in the flange 27 is a plurality of holes 28 which are aligned with holes 29 in the boss 24, and extending through the holes 28, 29 is a plurality of mounting screws 30. The bearing retainer sleeve 26 is also provided with a bore 31 for receiving spaced aligned ball bearings 32, 33 for journaling a worm shaft 34 which extends at right angles to the spindle 17 and is integrally provided on its inner end with a worm 35 which meshes with the worm gear 23. Intermediate its ends the worm shaft 34 is threaded for receiving a collar 35' which is drawn up against the bearing 32, and also mounted on the worm shaft 34 intermediate the bearings 32, 33 is a grease seal 36. Also rigidly mounted on the worm shaft 34 outwardly of the collar 35' is a pair of cone pulleys 37, 38. In connection with the present invention it should be noted that the center line of the worm shaft 34 is slightly eccentric to the center line of the bore 31 so that when the bearing retainer sleeve 26, together with the worm shaft 34, bearings 32, 33, collar 35', and seal 36 are assembled as a unit, and thereafter the bearing retainer sleeve 26 placed within the bore 25, the bearing retainer sleeve 26 can be rotated until the worm 35 properly meshes with the worm gear 23 eliminating any backlash therebetween. The holes 29 may then be readily drilled and tapped in proper alignment with the holes 28 at which time the bolts 30 can be threaded into the holes 29.

Integrally cast with the cover 8 and extending outwardly at one end thereof is a motor mount 39 having an electric motor 40 secured to its upwardly presented surface by means of bolts 41. The motor 40 is provided with a switch 42 and an electrical cable 43 which is connected to a suitable source of current (not shown). Projecting outwardly from the motor 40 and in spaced parallel relationship to the worm shaft 34 is a motor drive shaft 44 having rigidly mounted thereon cone pulleys 45, 46 which are aligned with the cone pulleys 37, 38, and trained around the pulleys 45, 38 is a flexible endless drive belt 47. It will, of course, be apparent that the belt 47 may also be trained around the pulleys 46, 37, when it is desired to rotate the spindle 17 at a reduced speed. Bolted or otherwise rigidly secured to the back wall 3 and covering the belt 46 and pulleys 37, 38, 45, 46 is a belt guard 48 having a lower section 49 and an upper section 50 which is secured to the lower section 49 by means of a hinge 51 so that the upper section 50 may be swung backwardly for access to the belt 47.

Formed in the diametrally enlarged end portion 22 and eccentric of the center line of the spindle 17 is a tapped hole 52 for threadedly receiving one end of a shoulder screw 53 which journals the upper end 54 of a crank 55. The crank 55 projects downwardly from the shoulder screw 53 into the housing 1 and toward the front wall 2, and at its lower end the crank 55 is rockably secured to a pawl-mounting plate 56 by means of a screw 57. Rotatably mounted in the pawl-mounting plate 56 and in spaced parallel relation to the screw 57 is a horizontally extending lead screw 58 which is parallel to the spindle 17 and is journaled in a vertical web 59 in the housing 1. The lead screw 58 is, furthermore, provided at its forward end with threads 60, for purposes presently more fully appearing. Adjacent the web 59, the lead screw 58 has rigidly mounted thereon a thrust collar 61, and also rigidly mounted on the lead screw 58 adjacent the pawl-mounting plate 56 is collar 62. Rigidly mounted on the rear end of the lead screw 58 by means of a set screw 63 is a hand wheel 64. Also rotatably mounted on the lead screw 58 is a feed selector drum 65 provided with a diametrally enlarged hub 66 having a flat surface 67 thereon. As seen by reference to FIG. 4 the hub 66 projects through a cover plate 68 which is bolted or otherwise removably secured to the end of the housing 1, and mounted on the hub 66 adjacent the cover plate 68 is a retaining ring 69. Projecting outwardly from the feed selector drum 65 is an operating handle 70, and the outer surface of the feed selector drum 65 is provided with a series of spaced feed-selector graduations $g$. Formed in the feed selector drum 65 are spaced parallel longitudinal bores 71, 72 which receive springs 73, 74 for biasing balls 75, 76 into locking engagement with anyone of a series of holes 77 which are formed in the cover plate 68. Pressed into and extending outwardly from the drum 65 in spaced parallel relation to the bores 71, 72 is a pin 78 which slides in an arcuate slot 79 formed in the cover plate 68. Bolted to the front wall 2 is an inspection plate 80 which affords access to the ratchet assembly, and the inspection plate is provided with a feed-reference mark $r$.

Keyed or otherwise rigidly secured to the lead screw 58 adjacent the pawl-mounting plate 56 and hub 66 is a ratchet 81 provided with peripheral teeth 82, the outer edges of which are spaced radially inwardly of the outer cylindrical surface of the hub 66 but project outwardly of the surface 67.

Rockably secured to the pawl-mounting plate 56 by means of a pawl pin 83 is a pawl 84 provided with a tip 85 for engagement with the ratchet teeth 82 and hub 66, and disposed around the pawl pin 83 is a spring 86 having an arm 87 which bears against the hub 66 and an arm 88 which bears against a pin 89 mounted on and projecting outwardly from the pawl 84 adjacent the tip 85, all for purposes presently more fully appearing.

Integrally formed on the front wall 2 and extending longitudinally therealong is a dovetail slide track 90 upon which is mounted for translation therealong a carriage 91 provided with a vertical web 92 having mounted thereon, by means of a bolt 93, a nut 94 for engagement with the threaded portion 60 of the lead screw 58. The upper horizontal surface of the carriage 91 is also provided with a dovetail slide 95 for slidably receiving a cross slide 96 shiftable at right angles to the spindle 17 and provided on its forward end with a depending web 97 which is bored for rotatably receiving a screw 98, the latter being threaded at one end for engagement with a tapped boss 99 integrally cast with the carriage 91. Rigidly mounted on the screw 98 inwardly of and adjacent the web 97 is a collar 100, and also mounted on the screw 98 adjacent to and outwardly of the web 97 by means of a set screw 101 is a cross feed knob 102 provided with a graduated dial 103. Extending into the cross slide 96 for optional locking engagement with the slide 95 is a lock screw 104. On its upper surface and at one side thereof, the cross-slide 96 is provided with a series of numbers spaced approximately one-half inch apart and corresponding to various nominal brake drum diameters, as best seen in FIG. 2. Also, formed on the upper surface of the cross slide 96 is a keyway 105 for slidably receiving a key 106 which is bolted to the underside of a tool holder slide 107, the latter being provided at its forward end with a longitudinal upwardly extending tool-holder seat 108. Projecting vertically upwardly from the tool holder slide 107 and through the tool holder seat 108 is a tool holder stud 109 which also extends through a longitudinal slot 110 formed in a longitudinally extending tool holder 111, the forward end of which is provided with a cutting tool 112. At its upper end the tool holder stud 109 is threaded for receiving a nut 113 and washer 114 for securing the tool holder 111 rigidly in the seat 108. As seen by reference to FIG. 2, the tool holder slide 107 is provided on one margin with a notch 115 for exposing one of the numerals on the cross slide 96. Rotatably mounted in the tool-holder slide 107 is a short pinion shaft 116 provided with a toothed pinion 117 rigidly secured thereon which meshes with the toothed rack 118 of an indexing pin 119, the latter being slidably mounted in a downwardly opening vertical bore 120 formed in the slide 107. The indexing pin 119 is also provided with a central bore 121 for receiving a compression spring 122 which extends upwardly therefrom and bears against the upper end of the bore 120. At its lower end the indexing pin 119 is provided with a rounded surface 123 for optional engagement with any one of a plurality of spaced vertical holes 124 which are formed in the upper surface of the cross slide 96 and are preferably spaced, center-to-center, one half inch apart along a line perpendicular to the axis of rotation of the spindle 17. At its outer end the shaft 116 is provided with a manipulating handle 125 for actuating the pinion 117.

Another important feature of the present invention resides in the novel method of manufacturing and assembling the brake drum lathe A. In this method the housing 1 and housing cover 8 are each cast as a unit and include bearing retainer portions 11a, 11b, 12a, 12b each having semi-circular edges 126 as seen in FIGS. 12–14. After the housing 1 and cover 8 are cast, the edges 126 are ground and, similarly, the edges 7, 9 are ground so that when the housing 1 and cover 8 are later assembled, the edges 7, 9 will meet and lie in a plane passing through the axis of rotation of the spindle 17 and the edges 126 will all lie at the same distance from the edges 7, 9.

Provided for disposition in the bearing retainer portions 11a, 11b, 12a, 12b is a precisely contoured mandrel 127 having cylindrical collars 128, 129 which are contoured to fit against the edges 126. The collars 128, 129 are provided with enlarged annular ribs 130, 131, 132, 133 and further enlarged sections 134, 135, the latter being of the same diameter and width as the ball bearings 15, 16. The combined widths of the ribs 130, 131 and section 134 is equal to the width of the bearing retainer portions 11a, 11b, and, similarly, the combined widths of the ribs 132, 133 and section 135 is equal to the width of the bearing retainer portions 12a, 12b, so that when the mandrel 127 is placed within housing 1 or cover 8 as shown in FIGS. 12 and 13, the sections 134, 135 will be spaced from the walls of the bearing retainer portions 11a, 11b, 12a, 12b and the center line of the mandrel 127 will lie in the plane of either the edge 7, or edge 9. When the mandrel 127 is placed within the housing 1, it is preferable to employ a clamp 136 provided on its vertical face with a slot 137 which is contoured to fit against the dovetail slide track 90, and an arm 138 removably mounted on the clamp body by bolts 139, 140. The arm 138 is, furthermore, provided with an inclined surface 141 adapted to fit against the lower inclined surface of the slide track 90. The clamp 136 is also provided with a lateral arm 142 the forward end of which has a downwardly presented split sleeve 143 for engagement around the mandrel 127. The center line or axis of the split sleeve 143 is precisely parallel to the surfaces of the slot 137 and inclined surface 141 so that when the clamp 136 is snugly secured in place by the bolts 139, 140, the axis of the mandrel 127 will be precisely parallel to the slide-track 90.

After the mandrel 127 is so placed successively within the housing 1 and cover 8, molten babbitt is poured into the bearing retainer portions 11a, 11b, 12a, 12b to a level slightly below the edges 7, 9 and thereafter allowed to solidify. Upon removal of the mandrel, the bearing retainer portions 11a, 11b, 12a, 12b will be provided with babbitt linings 13a, 13b, 14a, 14b as shown in FIG. 14. The spindle 17 with the bearings 15, 16 and worm gear 23 may be dropped into place in the housing 1, the cover 8 placed thereover so that the edges 7, 9 meet, and the bolts 10 secured in place. It will, therefore, be apparent that the foregoing method of assembling the housing 1, cover 8 and spindle permits accurate contouring of the babbitt linings 13, 14 to precisely the shape of the bearings 15, 16, but at the same time eliminates the necessity of machining the bearing retainers 11, 12 to the contour of the bearings 15, 16. Furthermore, since the use of the clamp 136 permits accurate aligning of the mandrel 127, the spindle 17, which occupies the same position as the mandrel 127, will be positioned so that its axis of rotation is precisely parallel to the slide-track 90.

Ordinarily when the housing 1 and cover 8 are removed from the molds in which they are cast, the tolerances are such that the surfaces 7, 9, 126 can be ground, and the mandrel 127 can be successively positioned in the housing 1 and cover 8 in the manner previously described. However, it occasionally happens that the castings become warped or molded with relatively poor tolerances in which case the mandrel 127 can be positioned within the housing 1 and held in place with a suitable jig or clamp prior to pouring the babbitt. After the babbitt has been poured and allowed to solidify, the cover 8 can be placed on the housing 1 so that the ground edges 7, 9 meet, and, without disturbing the mandrel 127, the latter can be clamped to the cover 8 and at the same time released from the housing 1. The babbitt can then be poured in the cover 8 in the manner previously described. Thus, by transferring the mandrel 127 from the housing 1 to the cover 8 by the use of clamps or jigs, the inaccuracies in the castings will offset each other and permit the babbitt to be poured so that it will form axially aligned bearing retainer linings.

In use, the work, such as an automotive brake drum is suitably placed on the diametrally reduced portion 18 of the spindle 17. The particular tool 112, requisite for the operation indicated, is then placed in the tool holder 111. The manipulating handle 125 is then pushed downwardly to withdraw the indexing pin 119 into the bore 120 so as to clear the holes 124, and the tool holder slide 107 manually shifted until the notch 115 exposes one of the numerals on the cross slide 96. The handle 125 then moves upwardly and the spring 122 forces the indexing pin 119 into the hole 124 aligned herewith. The exposed numeral corresponds to the nominal diameter of the brake drum and the cutting edge of the tool 112 will be spaced from the axis of the spindle by a distance, in inches, corresponding to one half of the exposed numeral. Thus if an eight inch diameter brake drum is to be finished, the numeral "8" will be exposed by the notch 115 and will place the cutting edge of the tool 112 four inches from the axis of rotation of the spindle 17. The hand wheel 64 is then rotated causing the lead screw 58 to shift the carriage 91 and bring the tool 112 into initial or starting position with reference to the work. Thereafter the cross feed knob 102 is rotated to shift the cross slide 96 and tool 112 transversely an amount depending upon the desired depth of cut to be taken from the work. The operating handle 70 is then lifted upwardly from the "neutral" or non-feeding position until one of the lines on the graduations g is aligned with the reference mark r so as to select the desired rate of feed. The movement of the operating handle 70 rotates the feed selector drum 64 and hub 66 thereof and allows one of the spring biased balls 75, 76 to snap into one of the holes 77 in order to lock the feed selector drum 65 in position.

With the belt 47 trained about the selected set of cone pulleys 37, 38, 45, 46 for rotation of the spindle 17 at the required speed, the switch 42 is actuated to operate the motor 40, whereupon the worm 35 rotates the worm gear 23 to impart rotation to the spindle 17. As the spindle 17 rotates the crank 55 will move up and down carrying with it the pawl-mounting plate 56 and pawl 84, the tip 85 of which initially rides along the outer cylindrical surface of the hub 66. When the crank 55 reaches a predetermined point on its upward travel, the pawl tip 85 will reach the flat surface 67 and, thereupon, will ride off of the hub 66 and engage one of the ratchet teeth 82 during the remainder of the upward movement of the crank 55. The pawl 84 will, therefore, rotate the ratchet 81 a fraction of a revolution, which, in turn rotates the lead screw 58 and shifts the carriage 91 therealong. On the downward stroke of the crank 55, the pawl tip 85 rides over the ratchet teeth 82 and returns to its initial position on the hub 66. The tool 112 is thus fed into the work in proportion to the amount of rotation of the ratchet 81 during each revolution of the spindle 17. When it is desired to change the feed rate, the feed selector drum 65 is rotated until another one of the lines on the graduations g is aligned with the reference mark r. This causes the flat surface 67 to be repositioned so that the pawl tip 85 will reach the flat surface 67 at an earlier or later moment during the upward movement of the crank 55, and thereby rotate the ratchet 81 a greater or lesser amount. Thus, when the feed selector drum 65 is rotated counterclockwise, reference being made to FIG. 7, the pawl 84 will rotate the ratchet 81 a progressively lesser amount. When the feed selector drum 65 is rotated counterclockwise the maximum amount so as to be in the "neutral" position, the pin 78 will abut the upper end of the slot 79, as viewed from FIG. 9, and the pawl tip 85 will not reach the flat surface 67 during movement of the crank 55 and, therefore, the ratchet 81 will not be rotated. Similarly, rotation of the feed selector drum 65 clockwise (viewed from FIG. 7) to the maximum feed position, will cause the pin 78 to abut the lower end of the slot 79, and flat surface 67 will be in position to permit maximum rotation of the ratchet 81 by the pawl 84.

It is to be noted that while the lathe A is particularly suitable for turning and truing brake drums, the lathe A is not limited to such use since it will be readily apparent that various other types of work may be mounted on the spindle 17 for turning and finishing.

It should be understood that changes and modifications in the form, construction, arrangement, and combination of the several parts of the lathes and method of making same may be made and substituted for those herein shown and described without departing from the nature and principle of my invention.

Having thus described my invention, what I claim and desire to secure by Letters Patent is:

1. A lathe comprising a housing, a spindle rotatably mounted in said housing, a gear mounted on said spindle, a carriage shiftable along said housing in spaced parallel relation to the spindle, means operatively interposed between the carriage and spindle for intermittently shifting said carriage in predetermined equal amounts as the spindle rotates, a bearing retainer sleeve mounted on said housing and being provided with a bore, the center line of which is perpendicular to the axis of the spindle, bearing means operatively mounted in said sleeve, a shaft rotatably mounted in said bearing means and having a center line eccentric to the center line of said bore, and gear means mounted on said shaft, said bearing retainer sleeve, bearing means and shaft being adapted for rotary adjustment in unison so as to mesh said gear means with said gear and remove any backlash therebetween.

2. A lathe comprising a housing, a spindle rotatably mounted in said housing, a gear mounted on said spindle, a carriage shiftable along said housing in spaced parallel relation to the spindle, means operatively interposed between the carriage and spindle for intermittently shifting said carriage in predetermined equal amounts as the spindle rotates, a cross-slide shiftable on said carriage along a path at right angles to the axis of rotation of said spindle, a tool-supporting slide mounted on the cross-slide and shiftable parallel to said path, said cross-slide having a plurality of spaced detent-recesses, a spring-biased detent element operatively mounted on the tool-supporting slide and selectively engageable with the cross slide at any one of a plurality of spaced points lying along a line perpendicular to the axis of rotation of said spindle, a bearing retainer sleeve mounted on said housing and being provided with a bore the center line of which is perpendicular to the axis of said spindle, bearing means operatively mounted in said sleeve, a shaft rotatably mounted in said bearing means and having a center line eccentric to the center line of said bore, and gear means mounted on said shaft and adapted to mesh with the gear on said spindle.

3. A lathe comprising a housing, a spindle rotatably mounted in said housing, a carriage shiftable along said housing in spaced parallel relation to the spindle, a cross-slide shiftable on said carriage along a path at right angles to the axis of rotation of said spindle, a tool-supporting slide mounted on the cross-slide and shiftable parallel to said path, said cross-slide having a plurality of longitudinally spaced detent-recesses, a spring-biased detent element slidable in the tool-supporting slide and adapted to interlock with the cross-slide at any one of a plurality of points spaced from and lying along a line perpendicular to the axis of rotation of the spindle, and manually actuable means operatively interengaged between the carriage and the base for shifting the carriage and cross-slide as a unit to effect vernier adjustments between the gross settings established by the detent element.

4. A lathe comprising a housing, a spindle rotatably mounted in said housing, a carriage shiftable along said housing in spaced parallel relation to the spindle, a cross-slide shiftable on said carriage along a path at right angles to the axis of rotation of said spindle, said cross-slide being provided with a plurality of holes spaced from each other along a line perpendicular to said axis of rotation, a tool-supporting slide mounted on said cross-slide and shiftable parallel to said path, a spring-biased detent element slidably mounted in said tool-supporting slide and adapted to selectively project into any one of said holes, and manually actuable means operatively interengaged between the carriage and the base for shifting the carriage and cross-slide as a unit to effect vernier adjustments between the gross settings established by the detent element.

5. A lathe comprising a housing, a spindle rotatably mounted in said housing, a carriage shiftable along said housing in spaced parallel relation to the spindle, a cross-slide shiftable on said carriage along a path at right angles to the axis of rotation of said spindle, said cross-slide being provided with a plurality of holes spaced uniformly from each other along a line perpendicular to said axes of rotation, a tool-supporting slide mounted on said cross-slide and shiftable parallel to said path, a spring-biased plunger slidably mounted in said tool-supporting slide and adapted to selectively project into any one of said holes, means for actuating said plunger, and manually actuable means operatively interengaged between the carriage and the base for shifting the carriage and cross-slide as a unit to effect vernier adjustments between the gross settings established by the detent element.

6. A lathe comprising a housing, a spindle rotatably mounted in said housing, a gear mounted on said spindle, a bearing retainer sleeve mounted on said housing and being provided with a bore the center line of which is perpendicular to the axis of the spindle, bearing means operatively mounted in said sleeve, a shaft rotatably mounted in said bearing means and having a center line eccentric to the center line of said bore, and gear means operatively mounted on said shaft, said bearing retainer sleeve, bearing means and shaft being adapted for rotary adjustment in unison so as to mesh said gear means with said gear and remove any backlash therebetween at which time the bearing retainer sleeve can be rigidly secured to the housing.

7. A lathe comprising a housing, a spindle rotatably mounted in said housing, a gear mounted on said spindle, a tubular boss integrally formed on said housing, a bearing retainer sleeve coaxially mounted in said boss and being provided with a bore the center line of which is perpendicular to the axis of the spindle, bearing means operatively mounted in said sleeve, a shaft rotatably mounted in said bearing means and having a center line eccentric to the center line of said bore, and gear means operatively mounted on said shaft, said bearing retainer sleeve, bearing means and shaft being adapted for rotary adjustment in unison so as to mesh said gear means with said gear and remove any backlash therebetween at which time the bearing retainer sleeve can be rigidly secured to the housing.

References Cited in the file of this patent

UNITED STATES PATENTS

| Number | Name | Date |
|---|---|---|
| 654,756 | Obermier | July 31, 1900 |
| 655,868 | Holtgen | Aug. 14, 1900 |
| 772,894 | Le Blond et al. | Oct. 18, 1904 |
| 855,039 | Baron | May 28, 1907 |
| 992,819 | Springer | May 23, 1911 |
| 1,003,036 | Crowe et al. | Sept. 12, 1911 |
| 1,007,182 | Chard | Oct. 31, 1911 |
| 1,314,598 | Luschka et al. | Sept. 2, 1919 |
| 1,465,258 | French | Aug. 21, 1923 |
| 1,891,185 | Miller et al. | Dec. 12, 1932 |
| 1,976,058 | Dilg | Oct. 9, 1934 |
| 2,021,537 | Bath et al. | Nov. 19, 1935 |
| 2,102,915 | Rishel | Dec. 21, 1937 |
| 2,289,703 | Goerke et al. | July 14, 1942 |
| 2,357,803 | Barrett | Sept. 12, 1944 |
| 2,542,616 | Barrett | Feb. 20, 1951 |
| 2,640,400 | Verderber | June 2, 1953 |
| 2,663,975 | Barrett | Dec. 29, 1953 |